United States Patent
Spieker

(10) Patent No.: US 7,925,410 B2
(45) Date of Patent: Apr. 12, 2011

(54) SPEED CONTROL STRATEGY

(75) Inventor: Arnie Spieker, Commerce Township, MI (US)

(73) Assignee: Kelsey-Hayes Company, Livonia, MI (US)

( * ) Notice: Subject to any disclaimer, the term of this patent is extended or adjusted under 35 U.S.C. 154(b) by 851 days.

(21) Appl. No.: 11/664,867

(22) PCT Filed: Oct. 7, 2005

(86) PCT No.: PCT/US2005/036008
§ 371 (c)(1),
(2), (4) Date: Oct. 12, 2007

(87) PCT Pub. No.: WO2006/042026
PCT Pub. Date: Apr. 20, 2006

(65) Prior Publication Data
US 2008/0195290 A1    Aug. 14, 2008

Related U.S. Application Data

(60) Provisional application No. 60/616,713, filed on Oct. 7, 2004.

(51) Int. Cl.
*B60T 8/1766* (2006.01)
(52) U.S. Cl. ................. 701/72; 701/70; 701/78
(58) Field of Classification Search ............ 701/70, 701/72, 78; 303/114.1, 113.4, 115.5
See application file for complete search history.

(56) References Cited

U.S. PATENT DOCUMENTS

| | | | |
|---|---|---|---|
| 3,844,625 A * | 10/1974 | Ingram et al. | 303/115.5 |
| 4,480,714 A | 11/1984 | Yabuta et al. | |
| 4,822,112 A * | 4/1989 | Reuter et al. | 303/122.09 |
| 5,691,900 A | 11/1997 | Luckevich | |
| 5,741,050 A * | 4/1998 | Ganzel et al. | 303/10 |
| 5,762,407 A * | 6/1998 | Stacey et al. | 303/155 |
| 5,765,118 A | 6/1998 | Fukatani | |
| 6,065,558 A | 5/2000 | Wielenga | |
| 6,086,168 A | 7/2000 | Rump | |
| 6,206,484 B1 * | 3/2001 | Ganzel | 303/113.4 |
| 6,263,261 B1 | 7/2001 | Brown et al. | |
| 6,278,930 B1 | 8/2001 | Yamada et al. | |
| 6,282,474 B1 | 8/2001 | Chou et al. | |
| 6,356,188 B1 | 3/2002 | Meyers et al. | |
| 6,370,467 B1 | 4/2002 | Kimbrough | |
| 6,421,592 B1 | 7/2002 | Bärgman et al. | |
| 6,431,663 B1 | 8/2002 | Fennel et al. | |
| 6,554,293 B1 | 4/2003 | Fennel et al. | |
| 6,843,538 B1 | 1/2005 | Nagae et al. | |
| 6,856,868 B1 | 2/2005 | Le et al. | |

(Continued)

FOREIGN PATENT DOCUMENTS
DE    3840564 A1    3/1990
(Continued)

*Primary Examiner* — Thomas G Black
*Assistant Examiner* — Marthe Marc Coleman
(74) *Attorney, Agent, or Firm* — MacMillan, Sobanski & Todd, LLC

(57) ABSTRACT

A method is provided for efficiently decelerating a vehicle having a braking circuit for braking a set of brake actuators. A flow of pressurized brake fluid is generated within the braking circuit. Normal force parameters exerted on each wheel of the braking circuit are determined. At least one respective brake actuator is isolated from receiving pressurized brake fluid for increasing the flow of pressurized brake fluid to a non-isolated wheel of the brake circuit in response to the normal force parameters.

33 Claims, 3 Drawing Sheets

U.S. PATENT DOCUMENTS

| | | | |
|---|---|---|---|
| 7,150,508 B2 * | 12/2006 | Ganzel | 303/113.4 |
| 7,165,008 B2 | 1/2007 | Choi | |
| 7,309,112 B2 * | 12/2007 | Isono | 303/11 |
| 2001/0043010 A1 | 11/2001 | Soejima et al. | |
| 2002/0011373 A1 | 1/2002 | Wielenga | |
| 2002/0056582 A1 | 5/2002 | Chubb et al. | |
| 2002/0173882 A1 | 11/2002 | Tobaru et al. | |
| 2003/0011241 A1 | 1/2003 | Batistic et al. | |
| 2003/0055549 A1 | 3/2003 | Barta et al. | |
| 2003/0100979 A1 | 5/2003 | Lu et al. | |
| 2003/0182041 A1 | 9/2003 | Watson | |
| 2003/0217883 A1 | 11/2003 | Wielenga | |
| 2004/0112665 A1 | 6/2004 | Wielenga | |
| 2004/0217647 A1 | 11/2004 | Einig et al. | |
| 2008/0284242 A1 * | 11/2008 | Ganzel | 303/114.1 |

FOREIGN PATENT DOCUMENTS

| | | |
|---|---|---|
| DE | 19958895 | 6/1999 |
| DE | 19958895 A1 | 6/2000 |
| DE | 10133409 | 1/2003 |
| EP | 0901929 | 3/1999 |
| EP | 0901929 A1 | 3/1999 |
| EP | 1046571 A2 | 10/2000 |
| JP | 2000168526 | 6/2000 |
| JP | 2000168526 A | 6/2000 |
| WO | 9901311 A1 | 1/1999 |
| WO | WO 99/01311 | 1/1999 |

* cited by examiner

SPEED CONTROL STRATEGY

CROSS REFERENCE TO RELATED APPLICATIONS

This application is the U.S. national phase of International Application No. PCT/US2005/036008, filed Oct. 7, 2005, which claims priority of U.S. Provisional Application Ser. No. 60/616,713 filed Oct. 7, 2004 the disclosures of which are both incorporated by reference.

STATEMENT REGARDING FEDERALLY SPONSORED RESEARCH

Not Applicable.

BACKGROUND OF THE INVENTION

1. Field of the Invention

The present invention relates to vehicle control systems for reducing the speed of a vehicle to improve vehicle dynamic conditions through the application of a vehicle brake actuation.

2. Description of the Related Art

In a variety of vehicle control systems it is advantageous to reduce the speed of the vehicle to improve the vehicle dynamic condition. This is primarily accomplished through the application of the vehicle brakes by hydraulic actuators which include pumps and solenoid valves. The fluid flow rate of the braking system is limited by the motor design, voltage, pump capacity, internal resistances and other braking system parameters. The fluid flow rate of pressurized brake fluid to the vehicle brake actuators provides one limit to the rate at which the speed of the vehicle is reduced. Under certain conditions such as ABS, roll mitigation, or other vehicle stability dynamic controls it is critical to achieve an instantaneous high level of deceleration for a vehicle. During conventional braking, pressurized brake fluid is supplied to all four brake actuators of the vehicle for a respective braking system having similar braking circuits and components and is equally distributed. As a result, the pumping of fluid to build pressure within each of the vehicle brake actuators during the initial braking stages will take longer than a brake circuit of a same volume but having fewer brake actuators.

Most pressure-volume relationships for brake calipers requires more fluid at lower pressures during initial application of applying a braking force on each of the brake actuators followed by a linear increase of fluid volume up to maximum pressure. This initial volume requirement is mostly due to knockback of the actuator pistons and seal compliance. This can be represented as a braking force to volume relationship. As a result, a large fluid volume is initially required at high flow rates of the brake fluid within a brake circuit. To avoid low braking forces during initial braking conditions, an increased pump flow rate must be obtained in each of the hydraulic brake circuits to increase the flow of brake fluid to each brake actuator. This results in high system cost.

SUMMARY OF THE INVENTION

The present invention has the advantage increasing the total braking force rate on a vehicle by isolating a respective wheel within a braking system having a low normal force during a vehicle dynamic condition for increasing the pressure and volume fluid flow rate of pressurized braking fluid to a non-isolated wheel having a higher normal force by isolating at least one brake actuator of a wheel having a lower normal force on the brake circuit.

In one aspect of the present invention, a method is provided for efficiently decelerating a vehicle having a braking circuit for braking a set of brake actuators. A flow of pressurized brake fluid is generated within the braking circuit. Normal force parameters exerted on each wheel of the braking circuit are determined. At least one respective brake actuator is isolated from receiving pressurized brake fluid for increasing the flow of pressurized brake fluid to a non-isolated wheel of the brake circuit in response to the normal force parameters.

In yet another aspect of the present invention, a method for efficiently decelerating the vehicle includes isolating at least one brake actuator for a wheel having a lower normal force than a wheel of a non-isolated brake actuator having a higher normal force.

In yet another aspect of the present invention, a method for efficiently decelerating the vehicle includes generating a flow of pressurized brake fluid within a second braking circuit. Determining normal force parameters exerted on each wheel of the second braking circuit. Isolating at least one respective brake actuator of the second braking circuit from receiving pressurized brake fluid for increasing the flow of pressurized brake fluid to a non-isolated brake actuator of the second brake circuit in response to the normal force parameters.

In yet another aspect of the present invention, a method for efficiently decelerating the vehicle a method includes isolating at least one brake actuator and applying braking to a non-isolated brake actuator during a vehicle stability control operation.

In yet another aspect of the present invention, a method is provided for efficiently decelerating a vehicle having a braking circuit for braking a set of brake actuators that includes isolating at least one brake actuator and applying braking to a non-isolated brake actuator during a vehicle stability control operation.

In yet another aspect of the present invention, a method for efficiently decelerating the vehicle having at least two split braking circuits for supplying pressurized brake fluid to a set of brake actuators includes generating a flow of pressurized brake fluid within at least two braking circuits. Determining normal force parameters exerted on each wheel of each braking circuit. Isolating at least one respective brake actuator from receiving pressurized brake fluid for a wheel when braking is initially applied for increasing the flow of pressurized brake fluid to at least one non-isolated brake actuator of a same brake circuit in response to the normal force parameters.

In yet another aspect of the present invention, a method for efficiently decelerating the vehicle having at least two split braking circuits for supplying pressurized brake fluid to a set of brake actuators includes isolating at least one respective brake actuator from receiving pressurized brake fluid for a wheel having a lower normal force for increasing the flow of pressurized brake fluid to the at least one non-isolated brake actuator for another wheel of the same brake circuit having a higher normal force.

In yet another aspect of the present invention, a method for efficiently decelerating the vehicle having at least two split braking circuits for supplying pressurized brake fluid to a set of brake actuators includes un-isolating each brake actuator for a wheel of each braking circuit after an initial stage of braking for allowing pressurized braking fluid to be applied to all brake actuators.

In yet another aspect of the present invention, a method for efficiently decelerating the vehicle having at least two split braking circuits for supplying pressurized brake fluid to a set of brake actuators In yet another aspect of the present invention, a method for efficiently decelerating the vehicle includes generating a flow of said pressurized brake fluid within a braking circuit having at least two brake actuators. Determining normal force parameters exerted on each wheel of the braking circuit. Isolating the pressurized brake fluid from at least one brake actuator of a wheel of the braking circuit during an initial braking stage in response to the normal force parameters.

In yet another aspect of the present invention, a method for efficiently decelerating the vehicle includes isolating the pressurized brake fluid from at least one brake actuator of a wheel of the braking circuit during an initial braking stage in response to the normal force parameters applying pressurized brake fluid to all vehicle wheels of the brake circuit after a predetermined period of time.

In yet another preferred embodiment of the present invention, vehicle stability control system for efficiently decelerating a vehicle includes a braking circuit for braking a set of brake actuators coupled to a set of wheels. A brake fluid pressurization system coupled to the braking circuit. A brake control module for controlling hydraulic pressure to each brake actuator. A controller having stored a vehicle dynamic model of said vehicle. At least one sensor for generating a signal indicative of normal force parameters. The brake fluid pressurization system generates a flow of pressurized brake fluid within the braking circuit. The at least one respective brake actuator of a wheel is isolated from receiving brake fluid in response to the normal force parameters. The flow of pressurized brake fluid is increased to at least one non-isolated brake actuator for a wheel of a same brake circuit in response to isolating the at least one brake actuator.

In yet another preferred embodiment of the present invention, vehicle stability control system for efficiently decelerating a vehicle includes un-isolating each brake actuator of each braking circuit after an initial stage of braking for allowing pressurized braking fluid to be applied to each brake actuator.

In yet another preferred embodiment of the present invention, vehicle stability control system for efficiently decelerating a vehicle includes a brake control module that includes a hydraulic braking boost system.

In yet another preferred embodiment of the present invention, vehicle stability control system for efficiently decelerating a vehicle includes a vehicle stability control module for performing a vehicle stability control operation.

In yet another preferred embodiment of the present invention, vehicle stability control system for efficiently decelerating a vehicle includes at least one brake actuator that is isolated and a non-isolated brake actuator for applying pressurized braking fluid to during said vehicle stability control operation.

In yet another preferred embodiment of the present invention, vehicle stability control system for efficiently decelerating a vehicle includes a vehicle stability control module having anti-lock brake functionality.

In yet another preferred embodiment of the present invention, vehicle stability control system for efficiently decelerating a vehicle includes a vehicle stability control module having traction control functionality.

In yet another preferred embodiment of the present invention, vehicle stability control system for efficiently decelerating a vehicle includes a vehicle stability control module having yaw stability control functionality.

In yet another preferred embodiment of the present invention, vehicle stability control system for efficiently decelerating a vehicle includes a vehicle stability control module having roll mitigation functionality.

In yet another preferred embodiment of the present invention, vehicle stability control system for efficiently decelerating a vehicle includes a split braking circuit having a vertical split braking circuit.

In yet another preferred embodiment of the present invention, vehicle stability control system for efficiently decelerating a vehicle includes a split braking circuit having a diagonal split braking circuit.

DETAILED DESCRIPTION OF PREFERRED EMBODIMENTS

Figure 1:
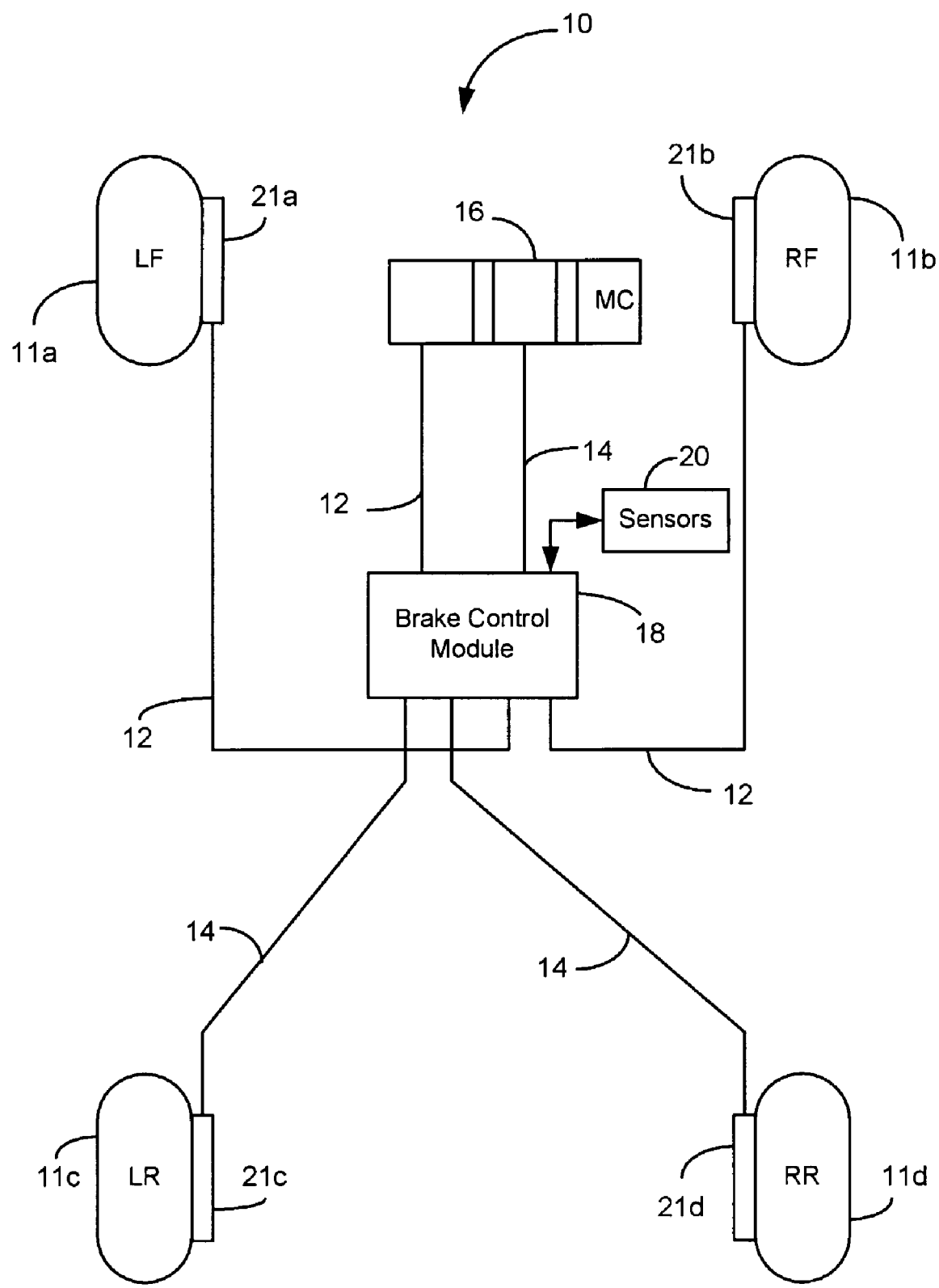
FIG. 1 is a schematic diagram of a hydraulic braking system according to the preferred embodiment of the present invention.

Referring now to the Drawings and particularly to FIG. 1, there is shown a schematic diagram of a hydraulic braking system for providing hydraulic brake fluid to a plurality of vehicle brake actuators. The hydraulic braking system is shown generally at 10. The hydraulic braking system 10 includes vehicle wheels 11a, b, c, and d. Vehicle brake actuators 21a, b, c, and d each include a respective brake actuation member (such as a slave cylinder) and friction member actuable by the actuation member for engaging a rotatable braking surface of the vehicle wheels 11a, b, c, and d, respectively. In the preferred embodiment, the vehicle braking system utilizes a vertically split braking system. A first circuit of pressurized hydraulic brake fluid 12 is provided for actuating vehicle brake actuators 21a and 21b. A second circuit of pressurized hydraulic brake fluid 14 is provided for actuating vehicle brake actuators 21c and 21d. Alternatively, the vehicle braking system may utilize a diagonally split braking system.

The source of pressurized brake fluid for the first circuit 12 and second circuit 14 is provided by a brake fluid pressurization system such as a manually operated master cylinder 16. The master cylinder is operated by a brake pedal to supply pressurized brake fluid to the first circuit 12 and the second circuit 14. Typically the master cylinder 16 includes a tandem master cylinder, having two service pistons, but the master cylinder 16 may be of any suitable design. The brake fluid pressurization system may further include a hydraulic braking boost system where a motor driven pump is used to generate pressurized brake fluid flow to the vehicle brake actuators. The hydraulic braking boost system may be activated upon a sensed input command by the driver operating the brake pedal or by a vehicle stability control system that monitors vehicle conditions such as, but not limited to, acceleration forces exerted on each wheel, driver's steering wheel input, yaw moment, or suspension changes.

A vehicle brake module 18 may include a vehicle stability control module in addition to the hydraulic braking boost system. The vehicle stability control (VSC) module may comprise ABS functionality, TC functionality, or YSC functionality. Additionally, the VSC may include a roll mitigation functionality for dynamically performing stability control functions for preventing a roll over. The vehicle brake module 18 receives pressurized hydraulic brake fluid from the first circuit 12 and the second circuit 14. The vehicle brake module 18 outputs pressurized hydraulic brake fluid to the respective vehicle brake actuators via the first circuit 12 and the second circuit 14. Various hydraulically controlled valves within the vehicle brake module 18 control the hydraulic pressure to the four vehicle brake actuators 21, a, b, c, and d independently for performing various deceleration or stability control operations. As a result, each vehicle wheel may be braked individually or in combination as well as being selectably isolated from any applied braking force.

FIG. 1 also shows at least one sensor 20 (e.g., accelerometer) disposed on the vehicle 10 for detecting vehicle operating conditions. For example, acceleration data retrieved from sensor 20 is provided to a controller (not shown) and when used in cooperation with a vehicle dynamic model stored in the memory of the controller or other memory device, the normal force parameters exerted on each wheel of the vehicle are determined. Determining normal force parameters include retrieving sensed inputs (or measured inputs) and processing such information to determine instantaneous normal forces exerted on each wheel. Determining normal force parameters may also include predicting normal forces derived from the sensed inputs. Furthermore, the exact values of the normal forces are not required, rather the relative magnitude of the normal forces with respect to each wheel may be the determining factor (i.e., higher/lower relative to one another). Based on the determined (i.e., instantaneous or predicted) normal forces, the various braking strategies as discussed infra may be applied. Other types of sensors may be used to monitor the vehicle operating conditions to determine or predict vehicle stability. Examples of data that may be monitored by various sensors include wheel speed, yaw rate, suspension changes, steering wheel changes, acceleration, roll angle data.

Figure 2:
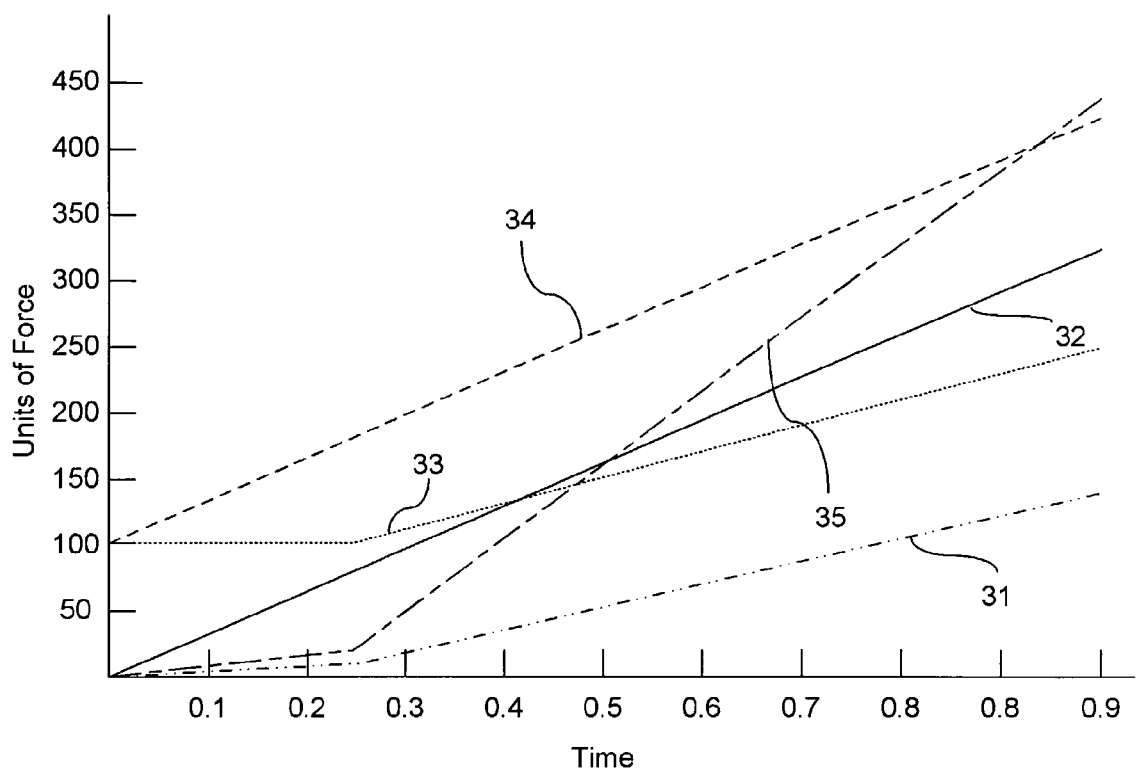
FIG. 2 is a graph illustrating the applied braking force to a pair of wheels of a brake circuit.

FIG. 2 is a graph illustrating a pressure and volume build when applying a braking force to both wheels on a respective braking circuit. A plurality of data measurements are shown for a given braking force exerted on two wheels of a same braking circuit. Data lines 31, 32, 33, and 34 represent pressures and volumes of braking fluid exerted on the two wheels within a respective braking circuit. Data lines 32 and 34 represent a controlled fluid volume flow rate into the braking circuit 12 when applying pressurized brake fluid on vehicle brake actuator 21a and 21b, respectively. The applied braking force may be applied as a result of the driver's input braking demand on the brake pedal or as vehicle stability control operation as demanded by the vehicle stability control system without the input of the brake pedal demand. Data lines 31 and 33 represent a pressure increase in braking circuit 12 when applying pressurized brake fluid on the vehicle brake actuators 21a and 21b, respectively. The horizontal axis (x-axis) is a measurement in units of time (e.g., seconds). The vertical axis (y-axis) is a measurement in units of force (e.g., Newton (N)). Data lines 33 and 34 are offset by 100 units of force so that both sets of data lines from each respective wheel may be illustrated on a single graph for comparison purposes. As shown from the graph, when a braking force is applied to each wheel of a respective braking circuit, pressure increases in both wheels at substantially the same rate over a period of time. Similarly, the fluid flow rate volume of brake fluid increases in both wheels at substantially the same rate over the same period of time. Data line 35 represents an effective braking force built over time as a result of the brake force applied by vehicle brake actuators 21a and 21b.

Figure 3:
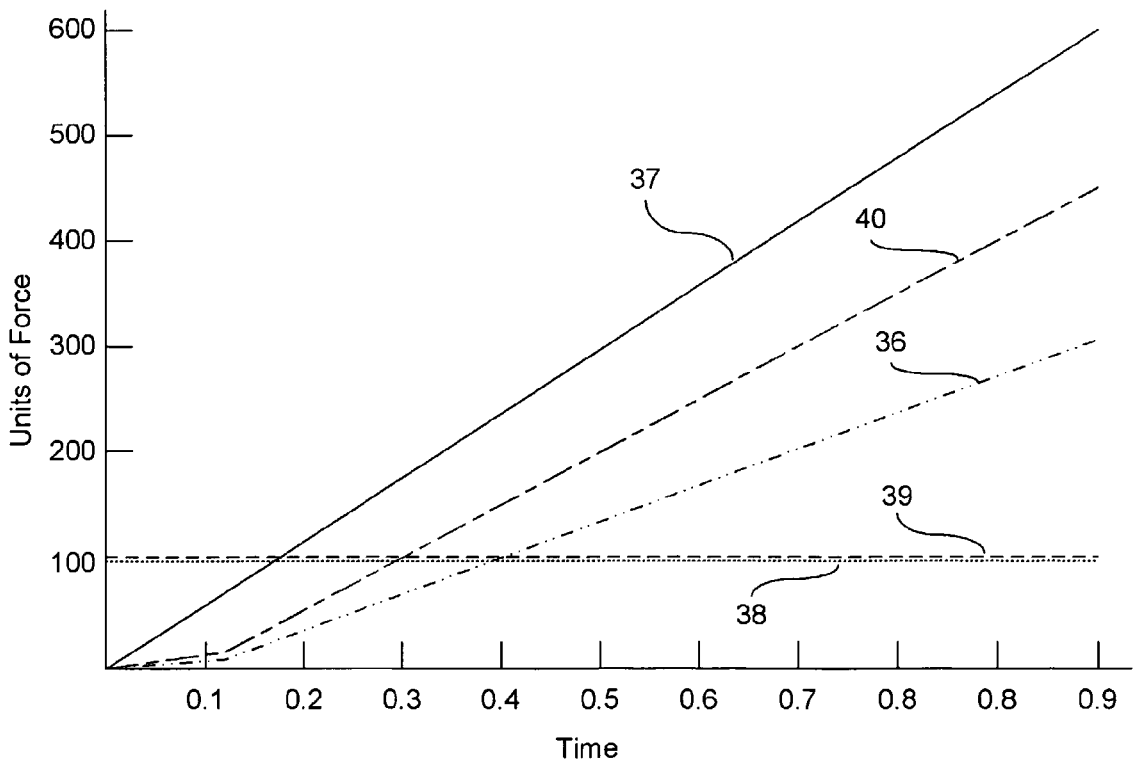
FIG. 3 is a graph illustrating the applied braking force to a single wheel of a brake circuit.

FIG. 3 is a graph illustrating pressure and volume build when applying a braking force only to a single wheel on a respective braking circuit. A plurality of data measurements are shown for a given braking force exerted only on a single brake actuator of a respective wheel of a respective braking circuit while the other brake actuator on the same respective circuit is isolated from the braking fluid of the respective circuit. Data lines 37 and 39 represent a controlled fluid volume flow rate within braking circuit 12 and to vehicle brake actuator 21a and 21b, respectively, when pressurized brake fluid is applied only on 21a.

Data lines 36 and 38 represent the pressure increase within braking circuit 12 and to vehicle brake actuator 21a and 21b, respectively when braking fluid is isolated from vehicle brake actuator 21b and is applied only to vehicle brake actuator 21a. Data lines 38 and 39 are offset by 100 units of force for comparison purposes with data lines 36 and 37, respectively. Since the vehicle brake actuator 21b is isolated from having a braking force applied to it, the pressure and volume increase of the front right wheel is zero. Data line 40 represents the effective braking force built over time as a result of the brake force applied by vehicle brake actuators 21a and 21b where braking force is applied only to vehicle brake actuator 21a during an initial stage of braking.

In comparing the pressure and volume builds of the graphs as illustrated in FIG. 2 and FIG. 3, it is shown that under a single wheel braking condition the pressure and volume of brake fluid applied to the single braking wheel increases more rapidly in the initial stages of braking when the braking force is first applied as opposed to the braking force when applied to both wheels of the same braking circuit over the same period of time. This is the result of having more braking fluid volume available to enter the front left brake actuator 21a since the front right brake actuator 21b is isolated. As discussed earlier, braking during the initial stages is based on a pressure to volume relationship. When applying braking fluid to only the single wheel of the braking circuit, the volume of braking fluid within the first circuit is not equally divided between the front left brake actuator 21a and the right front brake actuator 21b. Since the right front brake actuator 21b is isolated from receiving additional braking fluid, more brake fluid volume is available to be exerted on the left front brake actuator 21a in a shorter period of time under a same braking force. As a result, higher braking forces are exerted on the left front brake actuator 21a under the single braking condition in the initial stages of braking. It is shown by data line 40, in FIG. 2, that for a given level of force for a single wheel brake actuation, the braking force exerted on the vehicle at a respective time of 0.3 is 100 units of force. In comparison to the two wheel braking actuation, as shown in FIG. 1, the braking force exerted on the vehicle at a respective time of 0.3 is 35 units of force, as illustrated by data line 35. Therefore, to optimize the deceleration rate of a vehicle having two wheels on each brake circuit, it would be most effective to initially apply braking fluid to two wheels on opposite hydraulic circuits, rather than all four vehicle brakes simultaneously. Applying the pressurized brake fluid to only two of the vehicle brakes on opposite hydraulic brake circuits will create a greater braking force for a given fluid transfer.

For a given vehicle condition where one of the vehicle wheels is or will be in a condition of low normal force such that the inside wheels of a vehicle are at a high mu, the wheel having the low normal force will provide less braking force. If braking is applied to both wheels of the respective circuit under this condition, then the time required to build this low pressure can be significant. Since the wheel with the low normal force contributes little to the reduction of vehicle speed when braking is first applied, isolating this wheel from receiving additional brake fluid generates a pressure and volume increase in the non-isolated wheel having a high normal force. This results in an increase in the total vehicle brake force rate for decelerating the vehicle during this initial stage of braking. After the initial stage of braking, the isolated wheel having the lower normal force is un-isolated, thereby allowing all vehicle brakes to apply a braking force to the vehicle during a second stage where the braking force applied to both wheels is more effective than braking a single wheel of a brake circuit.

If rapid speed reduction is immediately required by respective braking systems such as stability control, or roll mitigation where a pair of wheels will be at low normal force, increased braking force for obtaining speed reduction may be obtained faster if braking pressure is applied only to the wheel of a respective circuit having a high normal load while the other wheel of the respective circuit under the low normal load is isolated.

Figure 4:
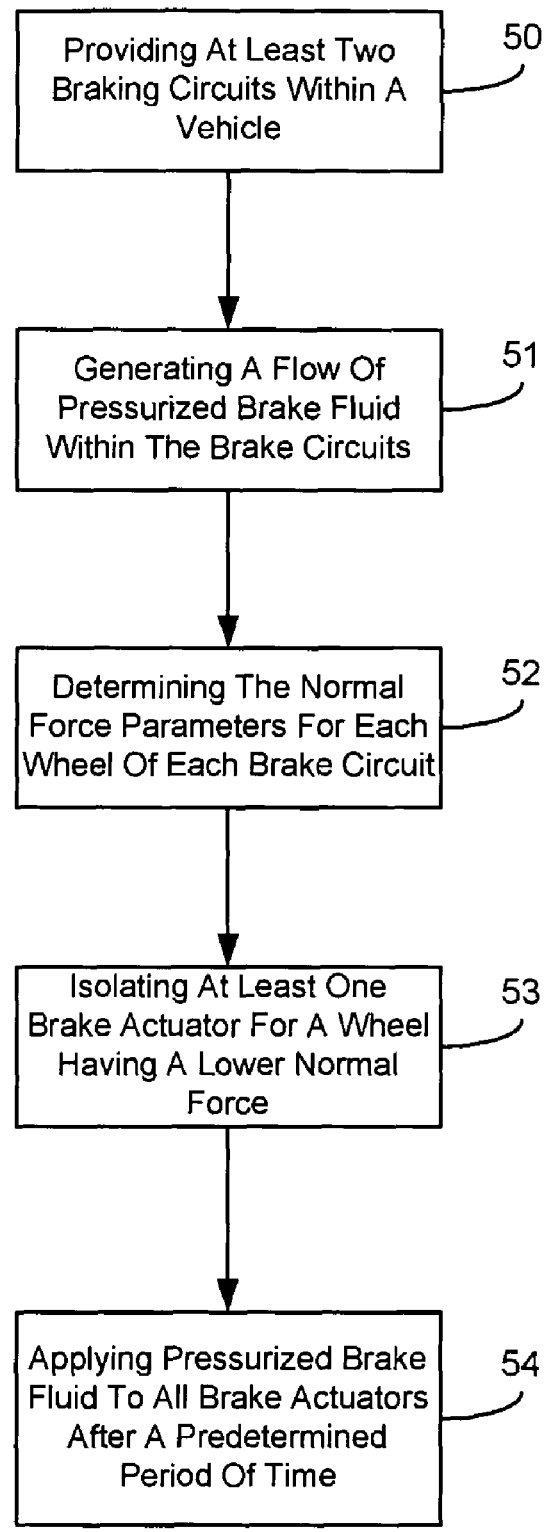
FIG. 4 is a method for increasing the total vehicle braking rate of a vehicle during initial braking.

FIG. 4 illustrates a method for increasing the total braking rate of a vehicle. In step 50, a vehicle is provided with at least two braking circuits. The braking system has similar braking circuits and components. In step 51, a flow of pressurized brake fluid is generated within each of the braking circuits. Each braking circuit will have valves to apply brake fluid flow to each individual brake actuator. In step 52, the normal force parameters exerted on each wheel of the vehicle are determined relative to one another. The determined normal forces may be normal forces that are being instantaneously applied or may be anticipated (i.e., predicted) normal forces given one or more sensed inputs. Such forces may be determined from various sensors disposed about the vehicle for sensing vehicle operating conditions and parameters. In step 53, at least one wheel having a lower normal force is isolated from receiving braking fluid for a predetermined period of time (i.e., initial stage). This allows additional volume to enter the un-isolated wheel for increased braking force. Additionally, each wheel having a lower normal force of a respective brake circuit may be isolated so that additional brake fluid volume within each circuit may be applied to the un-isolated brake wheel having the higher normal force. In step 54, after a predetermined period of time, brake fluid is applied to all brake actuators. After this predetermined period of time (i.e., at the beginning of a second stage) vehicle braking is optimized when a braking force is applied to all wheels of the vehicle.

TABLE OF REFERENCE NUMBERS

10 hydraulic braking system
11*a* vehicle wheel
11*b* vehicle wheel
11*c* vehicle wheel
11*d* vehicle wheel
12 first circuit of pressurized hydraulic brake fluid
14 second circuit of pressurized hydraulic brake fluid
16 master cylinder
18 vehicle brake module
20 at least one sensor
21*a* vehicle brake actuator
21*b* vehicle brake actuator
21*c* vehicle brake actuator
21*d* vehicle brake actuator
31 data line
32 data line
33 data line
34 data line
35 data line
36 data line
37 data line
38 data line
39 data line
40 data line

What is claimed is:

1. A method for efficiently decelerating a vehicle having a braking circuit for actuating a set of brake actuators, the method comprising the steps of:
generating a flow of pressurized brake fluid within said braking circuit;
determining normal force parameters exerted on each wheel of said braking circuit; and
isolating at least one respective brake actuator of said braking circuit from receiving pressurized brake fluid during an initial stage of braking, said isolation increasing said flow of pressurized brake fluid to a non-isolated brake actuator of said brake circuit in response to said normal force parameters.

2. The method of claim 1 wherein isolating at least one respective brake actuator includes isolating said at least one brake actuator for a wheel having a lower normal force than a wheel of said non-isolated brake actuator having a higher normal force.

3. The method of claim 1 wherein said brake circuit is a first brake circuit and further wherein the method includes the steps of:
generating a flow of pressurized brake fluid within a second braking circuit;
determining normal force parameters exerted on each wheel of said second braking circuit; and
isolating at least one respective brake actuator of said second braking circuit from receiving pressurized brake fluid for increasing said flow of pressurized brake fluid to a non-isolated brake actuator of said second brake circuit in response to said normal force parameters.

4. The method of claim 3 wherein isolating at least one respective brake actuator of said second braking circuit includes isolating said at least one respective brake actuator for a wheel having a lower normal force than a wheel of said non-isolated brake actuator having a higher normal force.

5. The method of claim 1 wherein said step of isolating at least one brake actuator and applying braking to a non-isolated brake actuator is applied during a vehicle stability control operation.

6. A method for efficiently decelerating a vehicle having at least two split braking circuits for supplying pressurized brake fluid to a set of brake actuators, the method comprising the steps of:
generating a flow of said pressurized brake fluid within said at least two braking circuits;
determining normal force parameters exerted on each wheel of each braking circuit; and
isolating at least one respective brake actuator from receiving said pressurized brake fluid for a wheel during a first stage of braking when braking is initially applied for increasing said flow of pressurized brake fluid to at least one non-isolated brake actuator of a same brake circuit in response to said normal force parameters.

7. The method of claim 6 wherein said at least one respective brake actuator is isolated from receiving said pressurized brake fluid for a wheel having a lower normal force for increasing said flow of pressurized brake fluid to said at least one non-isolated brake actuator for another wheel of said same brake circuit having a higher normal force.

8. The method of claim 7 further including the steps of un-isolating each brake actuator for a wheel of each braking circuit after an initial stage of braking for allowing pressurized braking fluid to be applied to all brake actuators.

9. The method of claim 7 wherein braking is applied in a vertical split braking circuit.

10. The method of claim 7 wherein braking is applied in a diagonal split braking circuit.

11. The method of claim 6 wherein said step of isolating at least one brake actuator and applying pressurized braking fluid to a non-isolated brake actuator is applied during a vehicle stability control operation.

12. The method of claim 11 wherein said vehicle stability control operation includes applying anti-lock braking.

13. The method of claim 11 wherein said vehicle stability control operation includes applying traction control.

14. The method of claim 11 wherein said vehicle stability control operation includes applying yaw stability control.

15. The method of claim 11 wherein said vehicle stability control operation includes applying roll mitigation braking.

16. The method of claim 6 wherein said step of generating a flow of pressurized brake fluid is generated in response to a driver's braking demand input.

17. The method of claim 6 wherein said step of generating a flow of said pressurized brake fluid is generated in response to a vehicle stability control operation.

18. A method for efficiently decelerating a vehicle, the method comprising the steps of:
generating a flow of said pressurized brake fluid within a braking circuit having at least two brake actuators;
determining normal force parameters exerted on each wheel of said braking circuit; and
isolating said pressurized brake fluid from at least one brake actuator of a wheel of said braking circuit for a first time period during an initial braking stage in response to said normal force parameters.

19. The method of claim 18 further comprising the steps of applying pressurized brake fluid to all vehicle wheels of said brake circuit after a predetermined period of time.

20. A vehicle stability control system for efficiently decelerating a vehicle,
said vehicle stability control system comprising:
a braking circuit for braking a set of brake actuators coupled to a set of wheels;
a brake fluid pressurization system coupled to said braking circuit, said brake fluid pressurization system operative to generate a flow of pressurized brake fluid within said braking circuit;
a brake control module for controlling hydraulic pressure to each brake actuator; and
a controller having stored a vehicle dynamic model of said vehicle; and at least one sensor for generating a signal indicative of normal force parameters, said controller operative to isolate at least one respective brake actuator of a wheel from receiving brake fluid in response to said normal force parameters during an initial stage of braking to increase said flow of pressurized brake fluid to at least one non-isolated brake actuator for a wheel of a same brake circuit.

21. The system of claim 20 wherein said normal force parameter is a measured normal force.

22. The system of claim 20 wherein said normal force parameter is a predicted normal force.

23. The system of claim 20 wherein said non-isolated brake actuator has a higher normal force relative to said isolated brake actuator.

24. The system of claim 20 wherein each brake actuator of each braking circuit is un-isolated after an initial stage of braking for allowing pressurized braking fluid to be applied to each brake actuator.

25. The system of claim 20 wherein said brake control module includes a hydraulic braking boost system.

26. The system of claim 20 wherein said brake control module includes a vehicle stability control module for performing a vehicle stability control operation.

27. The system of claim 26 wherein isolating at least one brake actuator and applying pressurized braking fluid to a non-isolated brake actuator is performed during said vehicle stability control operation.

28. The system of claim 20 wherein said vehicle stability control module includes anti-lock brake functionality.

29. The system of claim 20 wherein said vehicle stability control module includes traction control functionality.

30. The system of claim 20 wherein said vehicle stability control module includes yaw stability control functionality.

31. The system of claim 20 wherein said vehicle stability control module includes roll mitigation functionality.

32. The system of claim 20 wherein said braking circuit includes a vertical split braking circuit.

33. The system of claim 20 wherein said braking circuit includes a diagonal split braking circuit.

* * * * *